Dec. 30, 1941.  F. T. BOSHUYZEN  2,268,440
HEATING APPARATUS
Filed March 20, 1941
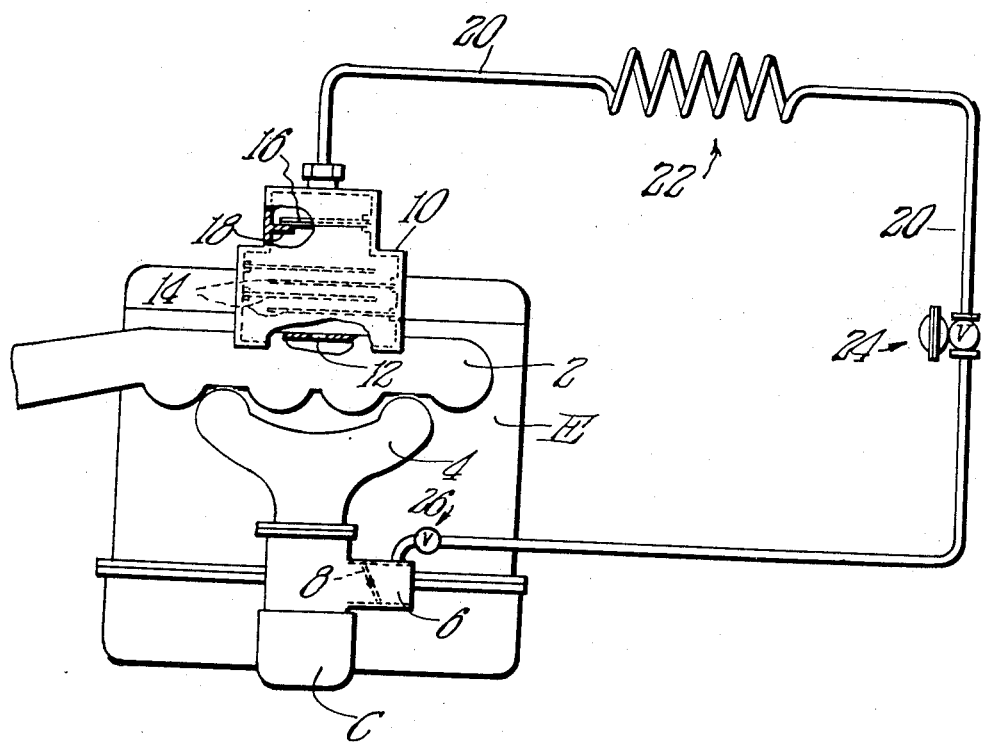
INVENTOR.
Franciscus T. Boshuyzen
BY
Walter C. Ross, Attorney.

Patented Dec. 30, 1941

2,268,440

UNITED STATES PATENT OFFICE 2,268,440

HEATING APPARATUS

Franciscus T. Boshuyzen, Springfield, Mass.

Application March 20, 1941, Serial No. 384,327

5 Claims. (Cl. 237—2)

This invention relates to improvements in heating apparatus and is directed more particularly to improvements in heating apparatus utilizable in connection with internal combustion engines.

The principal objects of the invention are directed to the provision of heating apparatus arranged and adapted to utilize the heat of the exhaust gases of an internal combustion engine. As will appear, I am particularly concerned with an engine adapted for use in aircraft.

There are many and various needs for employing the heat from exhaust gases but attempts to make use thereof heretofore have not been altogether satisfactory. The novel features of this invention are adapted for many and various uses. They are, however, especially adaptable for use in connection with aircraft of all kinds but it is not desired to be limited to such use or the specific form of apparatus disclosed for the purpose of explaining the invention.

It has been attempted heretofore to conduct the hot exhaust gases from an aircraft engine to heaters or pipes associated with parts of airplanes such as the wings but this has not been satisfactory due, among other reasons, to the velocity of the gases. That is, the gases travel so fast that it is difficult to obtain sufficient heat therefrom and/or to control either the gases or the heat.

According to this invention heat from the exhaust gases may be utilized and controlled without in any way interfering with the operation of the engine. In the description of the invention reference is made to aircraft such as the wing of a plane for which the apparatus is adapted but since it is adapted for many and various uses it is not desired to be so limited.

The invention will now be described in connection with the drawing, wherein the figure is a more or less diagrammatic view showing an internal combustion engine having the novel features associated therewith.

Referring now to the drawing more in detail, the invention will be fully described.

An internal combustion engine is represented by E. This may be of any type and will preferably have an exhaust manifold 2 connected to its exhaust ports for receiving exhaust gases therefrom.

An intake manifold is represented by 4 and this is connected to a carburetor C from which it receives a mixture of fuel and air and delivers the same to the engine E. The carburetor C has an air inlet 6 in which is a valve 8, commonly called a choke valve, that is oscillatable in the usual way to control air for mixing with the fuel.

In the operation of the engine, a mixture of air and fuel is drawn into the carburetor, the air entering inlet 6.

A housing 10 is provided which, according to the form of the invention shown, is disposed on the exhaust manifold 2 so as to provide therewith a closed chamber. An opening 12 provided in a wall of the manifold provides means for some of the hot gases to enter the chamber of the housing.

A plurality of baffles 14 are provided in the chamber and a bi-metal valve member 16 is also provided therein. The latter is secured within the housing at one end and is so arranged as to co-operate with a ledge 18 of the housing to close the outlet from the chamber.

The valve is arranged to move to closed position when a certain temperature is attained in the chamber and to remain open until that temperature is attained. Thus the flow of hot exhaust is stopped when the temperature reaches a certain desired point.

A conduit 20 leads from the chamber to a heating unit 22, which is preferably in the form of a coil, and from the said coil to the inlet 6 of the carburetor C. In the conduit there is a thermostatically-operated valve 24.

The heating unit may take any form desired depending upon the use for which the apparatus is to be employed and likewise the valves 16 and 24 may be of any desired form. The latter valve may be located as closely adjacent the heating unit as may be desired.

In operation with the valves open, the suction action of the engine draws the hot gases around through the intake of the carburetor. The valve 24 will be preferably adjusted to close at a temperature somewhat lower than that at which valve 16 closes.

In this way, while the valve 24 demands heat there is a flow of gas back to the carburetor; when the demand is satisfied valve 24 is closed to stop the flow of gases. Should the conduit or heating unit become ruptured or the valve 24 fail to function the valve 16 will close to stop the flow of gases. A valve 26 is provided in the conduit to control the flow of gases to the carburetor whereby it is possible to supply the desired amount of gas or control the flow thereof to some desired maximum.

According to the invention the flow of hot gases is controlled to the extent that the heating unit is suitably heated and to a temperature desired by adjustment of the valves while the cooler gases are conducted to the inlet of the engine which functions to bring about circulation of the gases. The so-called cooler gases returning to the carburetor are relatively warm as compared with the air drawn in by the carburetor which is an advantage to prevent possible freezing of moisture in the carburetor intake and valve.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with the exhaust outlet and fuel inlet of an internal combustion engine of means for utilizing heat of exhaust gases from said outlet comprising, a heating unit for exhaust gases, connecting means between said exhaust gases and heating unit and between said unit and fuel inlet providing a continuous closed circuit from said exhaust to said inlet, temperature controlled valve means in the connecting means from the exhaust to the heating unit responsive to and operable by the temperature of hot gases therein to close said circuit when a predetermined temperature prevails, and separate temperature controlled valve means in the connecting means between the heating unit and fuel inlet disposed adjacent said unit responsive to and operable by the temperature prevailing at said unit to close said circuit independently of said first-named valve means.

2. The combination of the exhaust manifold having an outlet and the inlet of an internal combustion engine with means for utilizing the heat from hot exhaust gases comprising, a housing associated with said exhaust manifold providing therewith a closed chamber for receiving hot gases, baffles in said chamber, a heating unit, a conduit leading from said heating chamber to said unit and from said unit to said inlet, a temperature controlled valve in said conduit between said heating unit and inlet disposed adjacent said unit responsive to the temperature prevailing in the vicinity of said unit, and temperature controlled valve means associated with the outlet from said chamber to said conduit responsive to the temperature of gases at said outlet.

3. The combination of the exhaust manifold having an outlet and a carburetor having an inlet connected to an internal combustion engine with means for utilizing heat from exhaust gases comprising, a housing associated with said exhaust manifold providing therewith a closed chamber for receiving hot gases and having an outlet provided with a temperature controlled valve responsive to the heat from exhaust gases, a heating unit, a conduit leading from the outlet of the chamber to said heating unit and a conduit leading from said unit to the inlet of said carburetor, and a temperature controlled valve in said last-named conduit disposed adjacent said heating unit responsive to temperature prevailing in the vicinity of said unit.

4. The combination of the exhaust manifold having an outlet and a carburetor having an inlet connected to an internal combustion engine with means for utilizing heat from exhaust gases comprising, a housing associated with said exhaust manifold providing therewith a closed chamber for receiving hot gases and having an outlet provided with a temperature controlled valve responsive to the temperature of the heat of exhaust gases, baffles in said chamber, a heating unit, a conduit leading from the outlet of the chamber to said unit and a conduit leading from said unit to the inlet of said carburetor, and a temperature controlled valve in said last-named conduit disposed adjacent said heat unit responsive to temperature prevailing in the vicinity of said unit.

5. The combination of the exhaust manifold having an outlet and a carburetor having an inlet connected to an internal combustion engine with means for utilizing heat from exhaust gases comprising, a housing associated with said exhaust manifold providing therewith a closed chamber for receiving hot gases and having an outlet provided with a temperature controlled valve responsive to the heat of exhaust gases, a heating unit, a conduit leading from the outlet of the chamber to said unit and a conduit leading from said unit to the inlet of said carburetor, a temperature controlled valve in said last-named conduit disposed adjacent said unit responsive to temperature prevailing in the vicinity of said unit, and a valve in said conduit between said temperature controlled valve and carburetor.

FRANCISCUS T. BOSHUYZEN.